US012669655B2

(12) United States Patent　　　(10) Patent No.: US 12,669,655 B2
Arao et al.　　　　　　　　　　　　(45) Date of Patent: Jun. 30, 2026

(54) OPTICAL CONNECTOR

(71) Applicants:SUMITOMO ELECTRIC INDUSTRIES, LTD., Osaka (JP); SUMITOMO ELECTRIC OPTIFRONTIER CO., LTD., Yokohama (JP)

(72) Inventors: Yuki Arao, Osaka (JP); Tetsu Morishima, Osaka (JP); Masahiro Shibata, Yokohama (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 283 days.

(21) Appl. No.: 18/570,267

(22) PCT Filed: Jun. 9, 2022

(86) PCT No.: PCT/JP2022/023311
§ 371 (c)(1),
(2) Date: Dec. 14, 2023

(87) PCT Pub. No.: WO2023/281976
PCT Pub. Date: Jan. 12, 2023

(65) Prior Publication Data
US 2024/0280763 A1　　Aug. 22, 2024

(30) Foreign Application Priority Data
Jul. 7, 2021　(JP) ................................. 2021-112954

(51) Int. Cl.
*G02B 6/38*　　　　(2006.01)

(52) U.S. Cl.
CPC ......... *G02B 6/3874* (2013.01); *G02B 6/3893* (2013.01)

(58) Field of Classification Search
CPC ........................... G02B 6/3873; G02B 6/3874
See application file for complete search history.

(56) References Cited

U.S. PATENT DOCUMENTS 5,216,733 A　　6/1993　Nagase et al.
6,227,721 B1 *　5/2001　Naito ................... G02B 6/4292
　　　　　　　　　　　　　　　　　　　　　　385/84
(Continued)

FOREIGN PATENT DOCUMENTS

JP　　H04-281409 A　　10/1992
JP　　H08-094879 A　　4/1996
(Continued)

OTHER PUBLICATIONS

Jul. 12, 2022 International Search Report issued in International Patent Application No. PCT/JP2022/023311.
(Continued)

*Primary Examiner* — Lisa M Caputo
(74) *Attorney, Agent, or Firm* — Oliff PLC

(57) ABSTRACT

An optical connector in one embodiment includes an optical fiber, a ferrule assembly, and a housing. The housing has a positioning part defining an accommodation position of the ferrule assembly. The positioning part has an inclined surface with which a part of the ferrule assembly is to contact and the ferrule assembly includes a ferrule, a sleeve, and a flange. The sleeve includes a projection and the flange is disposed between the positioning part and the projection of the sleeve, and has a flange front surface including an edge contacting the inclined surface of the positioning part and a flange rear surface contacting or being close to the projection of the sleeve.

5 Claims, 5 Drawing Sheets

(56) References Cited

U.S. PATENT DOCUMENTS

| | | |
|---|---|---|
| 6,287,018 B1 | 9/2001 | Andrews et al. |
| 6,705,765 B2 | 3/2004 | Lampert et al. |
| 2002/0186931 A1 | 12/2002 | Seo et al. |
| 2003/0215191 A1 | 11/2003 | Taira et al. |
| 2006/0257075 A1 | 11/2006 | Terakura |
| 2010/0272397 A1 | 10/2010 | Komaki et al. |
| 2014/0205241 A1 | 7/2014 | Nielson |
| 2015/0253517 A1 | 9/2015 | Taira et al. |
| 2017/0343745 A1 | 11/2017 | Rosson |
| 2019/0004254 A1 | 1/2019 | Yoshino et al. |
| 2019/0056557 A1 | 2/2019 | Wong et al. |
| 2019/0101704 A1* | 4/2019 | Morishima .......... G02B 6/3825 |
| 2019/0101705 A1 | 4/2019 | Morishima et al. |
| 2020/0301081 A1 | 9/2020 | Morishima |
| 2021/0033796 A1 | 2/2021 | Zimmel et al. |

FOREIGN PATENT DOCUMENTS

| | | |
|---|---|---|
| JP | H10-090558 A | 4/1998 |
| JP | 2002-318324 A | 10/2002 |
| JP | 2015-508188 A | 3/2015 |
| WO | 2013-126429 A2 | 8/2013 |

OTHER PUBLICATIONS

Katsuyoshi et al., "MU-Type Multi-core fiber connector", IEICE Technical Report, OCS2012-80 (Nov. 2012), Nov. 21-22, 2012, pp. 43-46.

Morishima et al., "Simple-Structure LC-Type Multi-Core Fiber Connector with Low Insertion Loss", OFC 2020.

* cited by examiner

OPTICAL CONNECTOR

TECHNICAL FIELD

The present disclosure relates to an optical connector.

This application claims priority based on Japanese Patent Application No. 2021-112954 filed on Jul. 7, 2021, and the entire contents of the Japanese patent application are incorporated herein by reference.

BACKGROUND ART

A single core optical connector attached to a tip portion of an optical fiber such as a multi-core optical fiber (hereinafter referred to as "MCF") or a polarization maintaining optical fiber (hereinafter referred to as "PMF") is provided with a structure for maintaining an alignment state of the optical fiber with respect to the optical connector. For example, according to a push-pull type optical connector disclosed in the following PTL 1 and non-PTL 1, a structure is adopted in which a ferrule assembly fixed to a tip portion of an optical fiber in a state in which the tip portion is inserted is accommodated in a housing, and a flange constituting a part of the ferrule assembly is pushed against a positioning part provided on an inner wall surface of the housing by using a spring member. In the push-pull type optical connector having such a structure, the ferrule assembly accommodated in the housing is prevented from being fluctuated in the accommodation position in the housing by the elastic force (restoring force) of the spring member, and the fluctuation of the azimuth around the fiber axis (central axis of the optical fiber to which the ferrule assembly is fixed) is suppressed (the alignment state is maintained).

CITATION LIST

Patent Literature

PTL 1: Japanese Unexamined Patent Application Publication No. 4-281409

Non Patent Literature

[Non-PTL 1] Tetsu Morishima, et al., "Simple-Structure LC-Type Multi-Core Fiber Connector with Low Insertion Loss", OFC2020, p. Th3I. 2

SUMMARY OF THE INVENTION

The optical connector of the present disclosure includes, an optical fiber, a ferrule assembly attached to a tip portion of the optical fiber, and a housing. The housing has an inner wall surface defining a space in which the ferrule assembly is to be accommodated, and a positioning part provided on the inner wall surface. The positioning part defines an accommodation position of the ferrule assembly and has an inclined surface inclined with respect to a central axis of the tip portion of the optical fiber and with which a part of the ferrule assembly is to contact. The ferrule assembly includes a ferrule, a sleeve and a flange. The ferrule is attached to the tip portion including an end surface of the optical fiber. The sleeve has a front end surface, a rear end surface facing each other, a sleeve through hole, and a projection. The sleeve through hole connects the front end surface and the rear end surface to each other and, with the optical fiber passing through the sleeve through hole, receives a part of the ferrule from a side where the front end surface is provided. The projection of the sleeve extends from a central axis of the sleeve through hole toward the inner wall surface of the housing has a projection front surface positioned on the side where the front end surface is provided, and a projection rear surface positioned on a side where the rear end surface is provided. The flange is disposed between the positioning part of the housing and the projection of the sleeve, and has a flange through hole receiving the sleeve, a flange front surface and a flange rear surface. The flange front surface includes an edge contacting the inclined surface of the positioning part of the housing. The flange rear surface contacts or is close to the projection front surface.

DETAILED DESCRIPTION

Figure 1:
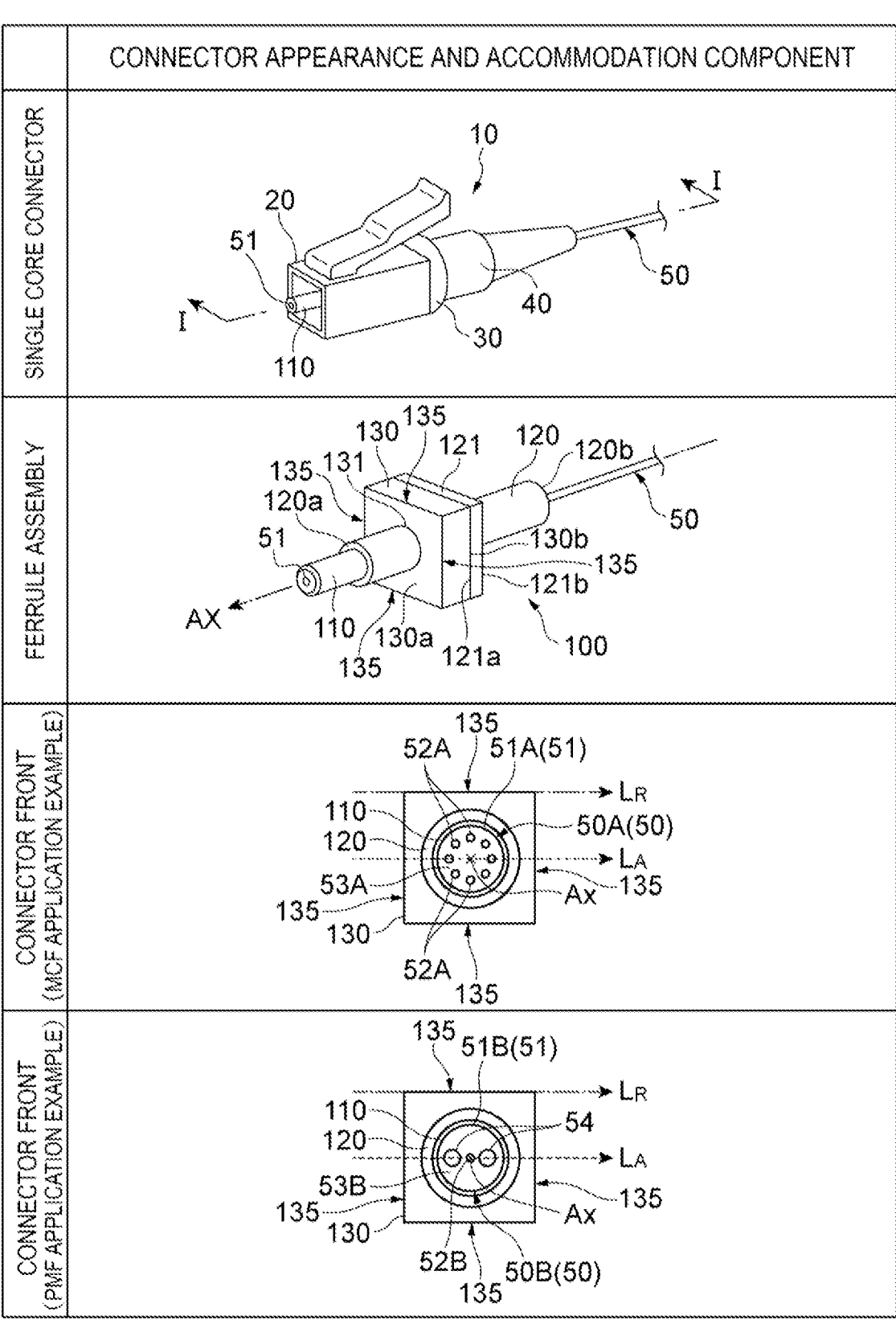
FIG. 1 is a view showing the structure of the main part of the optical connector of the present disclosure.

Problems to be Solved by Present Disclosure

As a result of studies on the above-described conventional techniques, the inventors have found the following problems. For example, the ferrule assembly disclosed in PTL 1 includes a ferrule fixed to a tip portion of an optical fiber, a sleeve which the ferrule is inserted into an opening of a front end surface, and a flange attached to the sleeve. It is noted that, PTL 1 discloses a structure in which a protrusion is provided on the outer peripheral surface of the sleeve to prevent the flange from moving toward the ferrule. In the push-pull type optical connector, the flange of the ferrule assembly having the above-described structure is pushed against a positioning part provided on an inner wall of the housing by a spring member accommodated in the rear of the housing. Therefore, according to the push-pull type optical connector, the ferrule assembly is disposed at a predetermined position with respect to the housing, and simultaneously, the alignment state of the optical fiber is fixed with respect to the optical connector.

However, the push-pull type optical connector disclosed in PTL 1 has a structure in which the elastic force of the spring member is directly applied to the flange in contact with the positioning part of the housing, and the sleeve into which the ferrule is inserted is held only by the flange. Therefore, when the optical connector is repeatedly attached and detached, there is a possibility that the relative positional relationship between the flange and the sleeve fluctuates.

The present disclosure has been made to solve the above-described problems, and the object is to provide an optical connector having a structure for suppressing a fluctuation in a relative positional relationship between a sleeve and a flange caused by attachment and detachment of the optical connector.

Advantageous Effects of Present Disclosure

According to the optical connector of the present disclosure, the fluctuation of the relative position and the relative angle between the sleeve and the flange caused by the attachment and detachment of the optical connector can be suppressed.

Description of Embodiments of Present Disclosure

First, each of the embodiments of the present disclosure is individually listed and described.

(1) The optical connector of the present disclosure includes, as one aspect thereof, an optical fiber, a ferrule assembly attached to a tip portion of the optical fiber, and a housing. The housing has an inner wall surface defining a space in which the ferrule assembly is to be accommodated, and a positioning part provided on the inner wall surface. The positioning part defines an accommodation position of the ferrule assembly and has an inclined surface inclined with respect to a central axis of the tip portion of the optical fiber and with which a part of the ferrule assembly is to contact. The ferrule assembly includes a ferrule, a sleeve and a flange. The ferrule is attached to the tip portion including an end surface of the optical fiber. The sleeve has a front end surface, a rear end surface facing each other, a sleeve through hole, and a projection. The sleeve through hole connects the front end surface and the rear end surface to each other and receives a part of the ferrule from a side where the front end surface is provided. It is noted that the timing at which the ferrule is attached to the tip portion of the optical fiber is not particularly limited in terms of structure. For example, the ferrule may be attached to the tip portion including the end surface of the optical fiber inserted into the sleeve through hole with the part of the ferrule received by the sleeve through hole. Alternatively, the part of the ferrule may be received by the sleeve through hole with the ferrule attached to the tip portion of the optical fiber (in a state where the ferrule passes through the sleeve through hole) in advance. The projection of the sleeve extends from a central axis of the sleeve through hole toward the inner wall surface of the housing and has a projection front surface positioned on the side where the front end surface is provided, and a projection rear surface positioned on a side where the rear end surface is provided. The flange is disposed between the positioning part of the housing and the projection of the sleeve, and has a flange through hole receiving the sleeve, a flange front surface and a flange rear surface. The flange front surface includes an edge contacting the inclined surface of the positioning part of the housing. The flange rear surface contacts or is close to the projection front surface. It is noted that, in the present specification, a state in which the flange rear surface is "close" to the projection front surface means a non-contact state between the flange rear surface and the projection front surface, which is defined as a state where the sleeve is inserted into the flange through hole, and at this time, the flange rear surface and the projection front surface directly face each other without an obstacle.

In the conventional optical connector, the relative positional relationship between the flange and the sleeve fluctuates, but in the optical connector of the present disclosure, the flange is disposed between the positioning part of the housing and the projection of the sleeve. In such a structure, the projection of the sleeve directly receives the elastic force of the elastic body such as a spring member, a rubber material or the like, and also functions to push the flange against the positioning part of the housing. In this case, since the projection of the sleeve functions to push the flange against the positioning part of the housing, the fluctuation in the relative positional relationship between the flange and the sleeve is less likely to occur.

(2) As one aspect of the present disclosure, the optical connector may further include an elastic body contacting the projection rear surface, and provided for pushing the edge of the flange front surface against the inclined surface of the positioning part through the projection. In this case, the elastic body is preferably a material having an elastic force such as a spring member or a rubber material. Accordingly, it is possible to achieve a push-pull type optical connector in which the installation position of the ferrule assembly in the housing is stably fixed by using the elastic body.

(3) As an aspect of the present disclosure, it is preferable that the optical fiber may include a multi-core optical fiber or a polarization maintaining optical fiber as the optical fiber that requires alignment with respect to a direction about its central axis (fiber axis). As described above, due to the configuration of the ferrule assembly and the positioning part in the optical connector of the present disclosure, the alignment state of the optical fiber can be favorably maintained.

As described, each embodiment listed above in this "Description of Embodiments of Present Disclosure" is applicable to each and every remaining embodiment, or to every combination of these remaining embodiments.

Details of Embodiments of Present Disclosure

Hereinafter, specific structures of the optical connector according to the present disclosure are described in detail with reference to the accompanying drawings. It is noted that the present invention is not limited to these examples, but is defined by the scope of claims, and is intended to include all modifications within the meaning and scope equivalent to the scope of claims. Also, in the description of the drawings, the same elements are denoted by the same reference numerals, and redundant description thereof is omitted.

FIG. 1 is a view showing the structure of the main part of the optical connector of the present disclosure (in FIG. 1, referred to as "Connector Appearance and Accommodation Component"). Specifically, an example of the appearance of a push-pull type optical connector 10 as an example of the optical connector of the present disclosure is shown in the uppermost row (in FIG. 1, referred to as "Single Core Connector"). The structure of a ferrule assembly 100 installed inside optical connector 10 is shown in the second row (in FIG. 1, referred to as "Ferrule Assembly"). As an example of an optical fiber 50 (optical fiber requiring alignment) to which a ferrule 110 is attached, a front view of optical connector 10 including an end surface of an MCF 50A (multi-core optical fiber) is shown in the third row (in FIG. 1, referred to as "Connector Front (MCF Application Example)"). As another example of optical fiber 50 to which ferrule 110 is attached, a front view of optical connector 10 including an end surface of a PMF 50B (polarization maintaining optical fiber) is shown in the lowermost row (in FIG. 1, referred to as "Connector Front (PMF Application Example)").

The housing of optical connector 10 shown in the uppermost row of FIG. 1 is composed of a front housing 20 and a rear housing 30, and ferrule assembly 100 including ferrule 110 and a spring member for stably maintaining the accommodation position of ferrule assembly 100 are accommodated in the housing. Ferrule 110 is attached to the tip portion (a glass fiber 51 from which the resin coating is removed) including the end surface of optical fiber 50, and boots 40 is attached to rear housing 30 to protect optical fiber 50 extending from rear housing 30.

Ferrule assembly 100 shown in the second row of FIG. 1 is accommodated in the housing formed of front housing 20 and rear housing 30, and includes ferrule 110, a sleeve 120, and a flange 130. Optical fiber 50 includes glass fiber 51 and a resin coating provided on an outer peripheral surface of glass fiber 51, and the resin coating covering a tip portion including an end surface of optical fiber 50 is removed. Ferrule 110 is attached to the tip portion of optical fiber 50 from which the resin coating is removed by using an adhesive (e.g., a thermosetting resin or an ultraviolet curable resin). Sleeve 120 has a front end surface 120*a* and a rear end surface 120*b* opposite to each other, a through hole (sleeve through hole), and a projection 121 extending from a central axis of the through hole of the sleeve toward an inner wall surface of the housing. The through hole of sleeve 120 connects front end surface 120*a* and rear end surface 120*b* to each other and, with optical fiber 50 passing through the through hole, receives a part of ferrule 110 from a side where the front end surface is provided. Further, optical fiber 50 may be inserted into ferrule 110 after the rear portion of ferrule 110 is interference-fitted into the front end surface of the through hole of sleeve 120. Projection 121 of sleeve 120 has a front surface 121*a* (projection front surface) and a rear surface 121*b* (projection rear surface). Front surface 121*a* of projection 121 is positioned on the side where front end surface 120*a* of sleeve 120 is provided. Rear surface 121*b* of projection 121 is positioned on a side where rear end surface 120*b* is provided. Flange 130 is disposed between the positioning part of the housing and projection 121 of sleeve 120, and has a through hole 131 (flange through hole), a front surface 130*a* (flange front surface), a rear surface 130*b* (flange rear surface), and an outer peripheral surface. Front surface 130*a* of flange 130 includes an edge 135 contacting the inclined surface of the positioning part of the housing. When the boundary between front surface 130*a* and the outer peripheral surface is chamfered, the "edge" includes the chamfered portion, and a part of the "edge" including the chamfered portion contacts the inclined surface of the positioning part of the housing. Rear surface 130*b* of flange 130 contacts or is close to front surface 121*a* of projection 121. It is noted that a state where rear surface 130*b* of flange 130 is close to front surface 121*a* of projection 121 is a non-contact state between rear surface 130*b* of flange 130 and front surface 121*a* of projection 121, which is defined as a state where sleeve 120 is inserted into through hole 131 of flange 130.

The front view (Connector Front (MCF Application Example)) of optical connector 10 shown in the third row of FIG. 1 shows the end surface of MCF 50A as optical fiber 50 requiring alignment, ferrule 110 attached to the tip portion (a glass fiber 51A) of MCF 50A, sleeve 120 which receives ferrule 110, and flange 130. MCF 50A includes a plurality of cores 52A each extending along a fiber axis AX (central axis of MCF 50A) and a common cladding 53A surrounding each of the plurality of cores 52A. A line $L_A$ indicates a reference direction (direction of a rotation angle of 0°) of rotational alignment of MCF 50A, and a line $L_R$ is a setting reference line of ferrule assembly 100 along edge 135 of flange 130. In ferrule assembly 100 including MCF 50A after alignment, line $L_A$ indicating reference direction and setting reference line $L_R$ are parallel to each other.

The front view (Connector Font (PMF Application Example)) of optical connector 10 shown in the lowermost row of FIG. 1 shows the end surface of PMF 50B as optical fiber 50 requiring alignment, ferrule 110 attached to the tip portion (a glass fiber 51B) of PMF 50B, sleeve 120 into which ferrule 110 is inserted, and flange 130. PMF 50B includes core 52B extending along fiber axis AX (central axis of PMF 50B), stress applying parts 54 disposed to sandwich core 52B, and a common cladding 53B surrounding core 52B and stress applying parts 54. In ferrule assembly 100 including PMF 50B after alignment, line $L_A$ indicating reference direction and setting reference line $L_R$ are parallel to each other.

Figure 2:
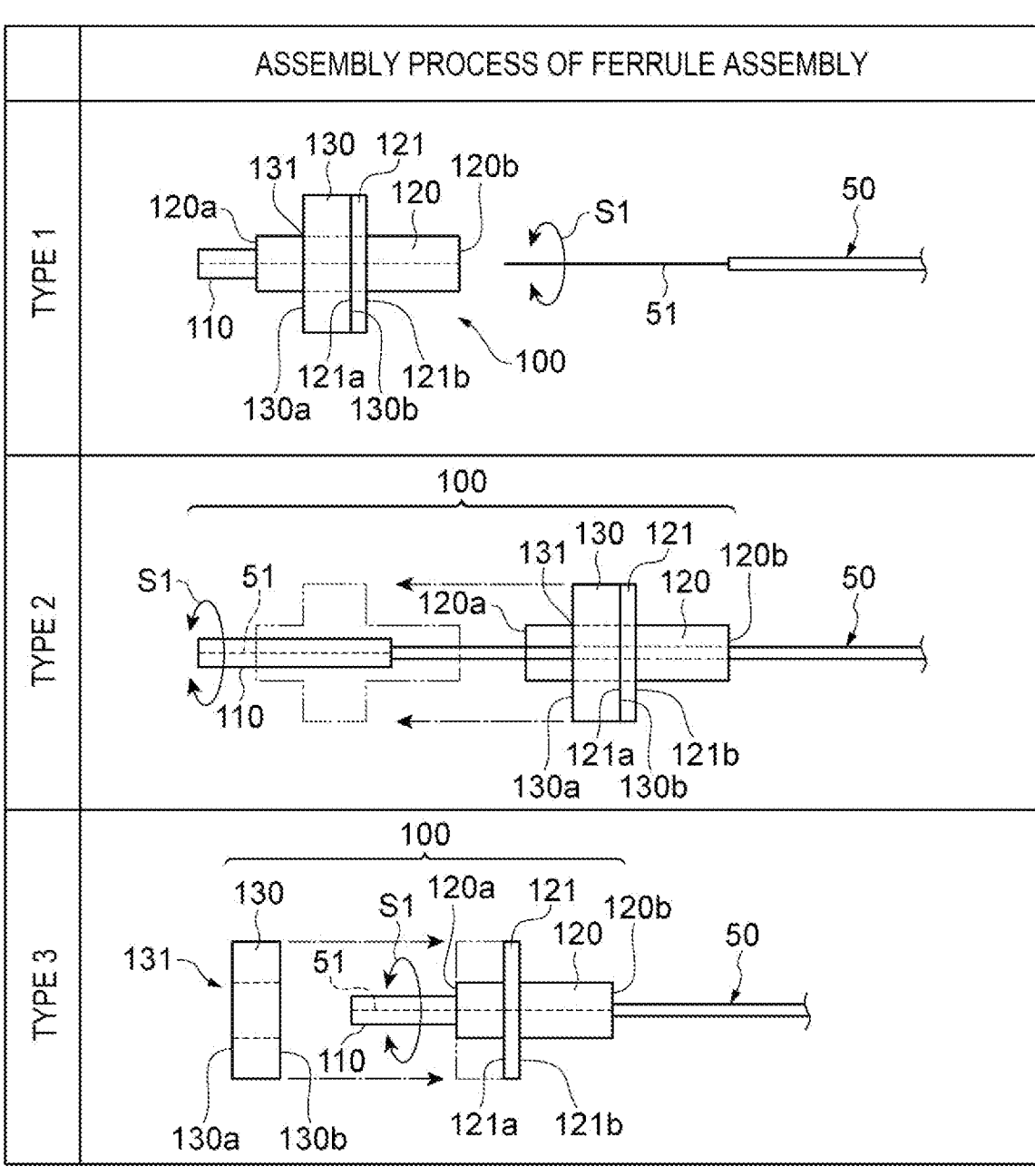
FIG. 2 is a view for explaining various assembly processes (including an aligning operation) of the ferrule assembly.

FIG. 2 is a view for explaining various assembly processes (including an aligning operation) of the ferrule assembly (in FIG. 2, referred to as "Assembly Process of Ferrule Assembly"). Specifically, the upper row (in FIG. 2, referred to as "Type 1") is a view for explaining a method of aligning optical fiber 50 with respect to ferrule assembly 100 which is assembled in advance. The middle row (in FIG. 2, referred to as "Type 2") is a view for explaining a method of assembling ferrule assembly 100 by aligning optical fiber 50 having ferrule 110 attached to the tip portion thereof with respect to flange 130 integrated with sleeve 120. The lower row (in FIG. 2, referred to as "Type 3") is a view for explaining a method of assembling ferrule assembly 100 by aligning optical fiber 50 having ferrule 110 and sleeve 120 attached to the tip portion with respect to flange 130.

In "Type 1" shown in the upper row of FIG. 2, a structure to be ferrule assembly 100 is assembled before being attached to the tip portion (glass fiber 51) of optical fiber 50. As described above, ferrule assembly 100 includes ferrule 110, sleeve 120 having front end surface 120*a*, rear end surface 120*b*, and projection 121, and flange 130 having front surface 130*a* and rear surface 130*b*. In addition, a front portion of sleeve 120 (a section between front end surface 120*a* and projection 121) passes through through hole 131 of flange 130, and projection 121 of sleeve 120 has front surface 121*a* and rear surface 121*b*. Front surface 121*a* of projection 121 contacts or is close to rear surface 130*b* of flange 130, and the spring member contacts rear surface 121*b* of projection 121. When the aligning operation of optical fiber 50, which is performed by rotating optical fiber 50 by a predetermined angle in the direction indicated by an arrow S1 with respect to ferrule assembly 100, is completed, ferrule 110 of ferrule assembly 100 which has already been assembled is attached to the tip portion of aligned optical fiber 50. The front view of ferrule assembly 100 attached to optical fiber 50 after alignment coincides with the front view shown in the third row and the lowermost row of FIG. 1.

In "Type 2" shown in the middle row of FIG. 2, in a state where ferrule 110 is attached to the tip portion (glass fiber 51) of optical fiber 50, alignment of optical fiber 50 (rotational operation of optical fiber 50 along a direction indicated by arrow S1) is performed with respect to an already assembled structure (sleeve member) formed of sleeve 120 and flange 130. During alignment, optical fiber 50 is maintained in a state of passing through the through hole of the sleeve member. When the aligning operation is completed, one end of ferrule 110 attached to the tip portion of optical fiber 50 is inserted into the through hole of sleeve 120 from a side where front end surface 120*a* of sleeve 120 is provided. The front view of ferrule assembly 100 attached to optical fiber 50 after alignment coincides with the front view shown in the third row and the lowermost row of FIG. 1.

Further, in "Type 3" shown in the lower row of FIG. 2, in a state where a structure formed of ferrule 110 and sleeve 120 is attached to and integrated with the tip portion (glass fiber 51) of optical fiber 50, alignment of optical fiber 50 with respect to flange 130 (rotational operation of optical fiber 50 along the direction indicated by arrow S1) is performed. When the alignment operation is completed, ferrule 110 side (the front portion of sleeve 120) of the structure (ferrule 110 and sleeve 120) attached to the tip portion of optical fiber 50 is inserted into through hole 131 of flange 130 toward the position of projection 121. As a result, rear surface 130b of flange 130 and front surface 121a of projection 121 contacts or is close to each other. The front view of ferrule assembly 100 attached to optical fiber 50 after alignment coincides with the front view shown in the third row and the lowermost row of FIG. 1.

Figure 3:
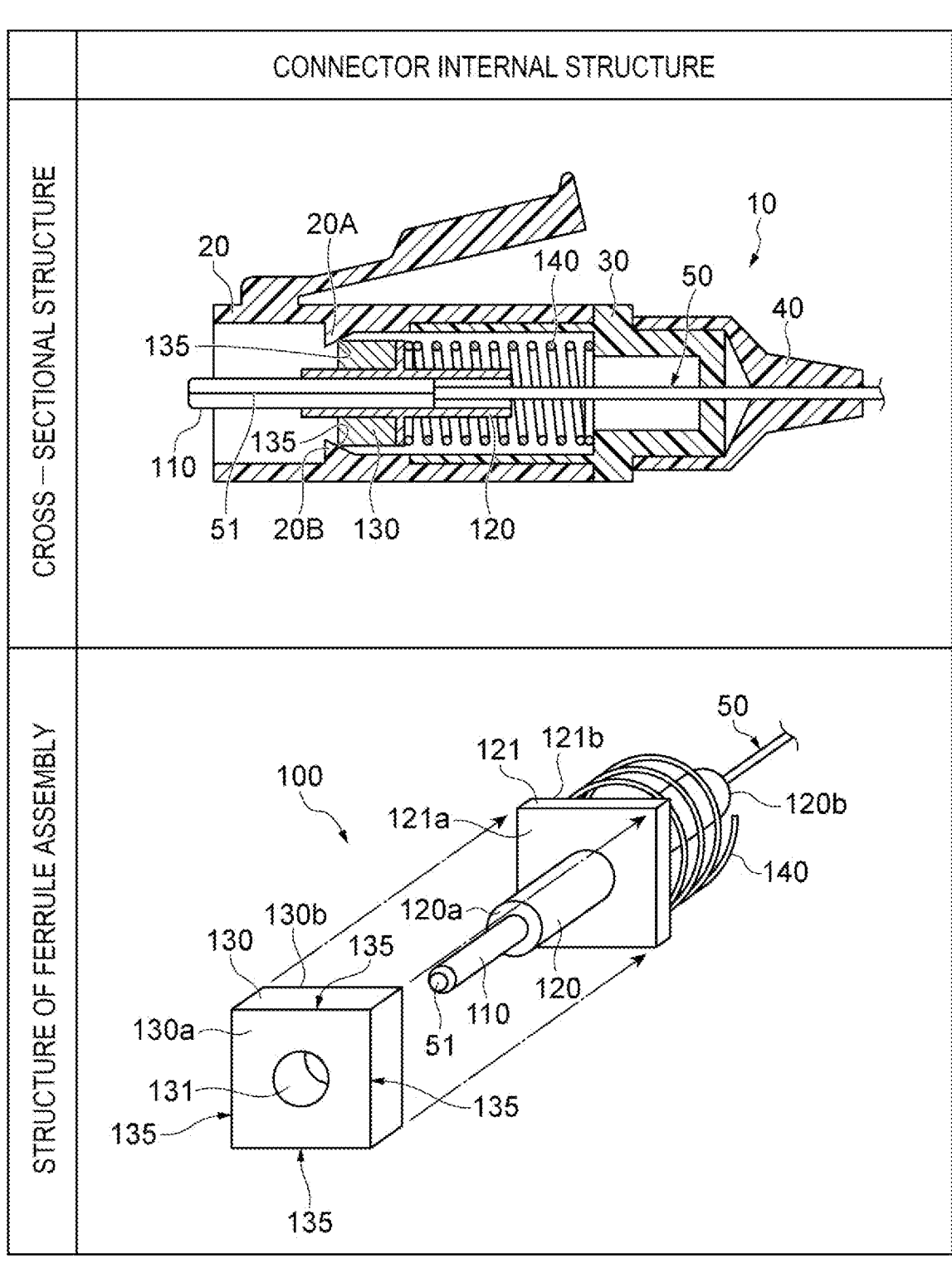
FIG. 3 is a view showing the internal structure of the optical connector of the present disclosure.
Figure 4:
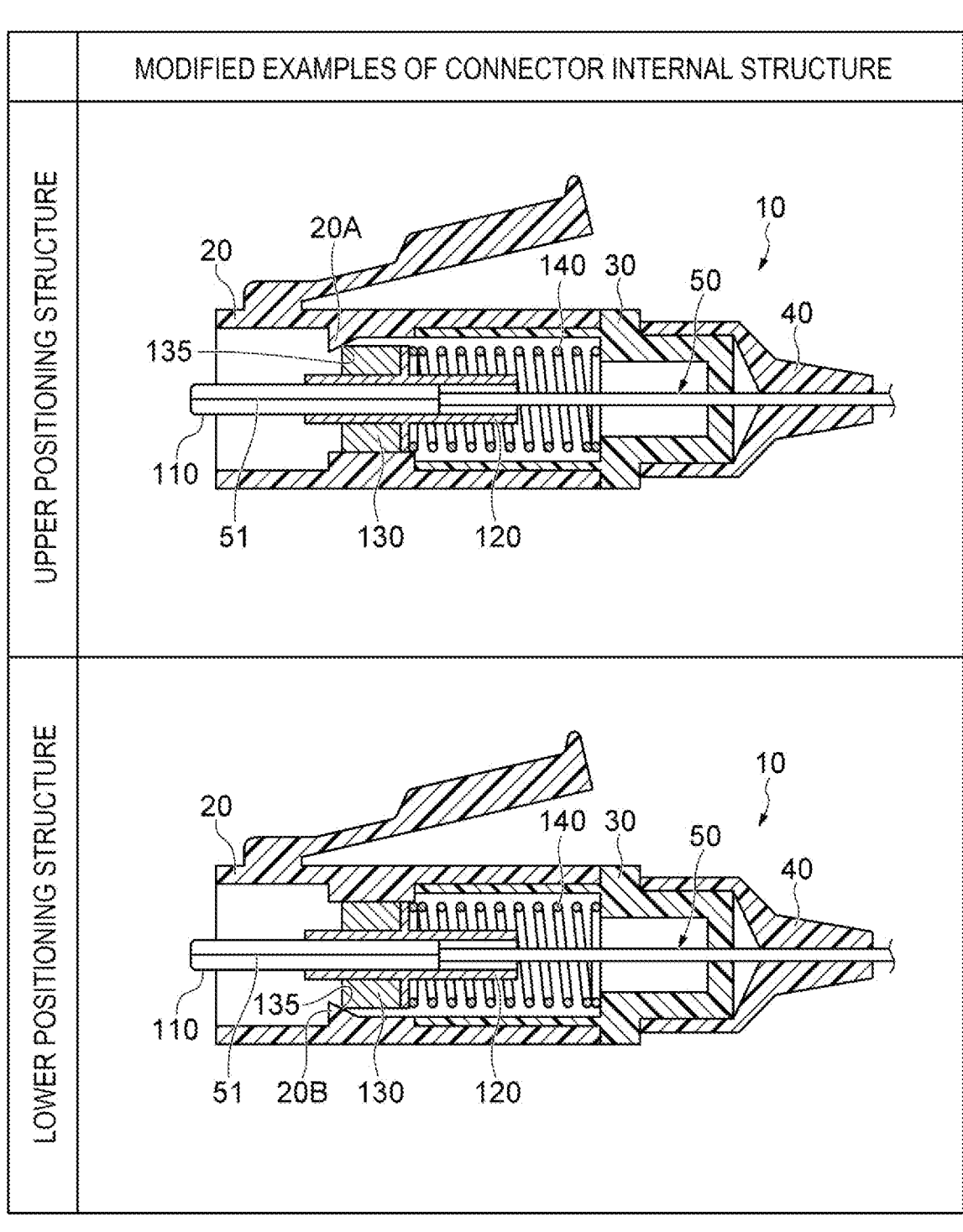
FIG. 4 is a view showing the modified examples of the internal structure of the optical connector of the present disclosure.

FIG. 3 is a view showing the internal structure of the optical connector of the present disclosure (in FIG. 3, referred to as "Connector Internal Structure"). Specifically, the upper row (in FIG. 3, referred to as "Cross-Sectional Structure") is a cross-sectional view of optical connector 10 taken along line I-I shown in the uppermost row of FIG. 1. The lower row (in FIG. 3, referred to as "Structure of Ferrule Assembly") is a view for explaining details of the assembly process (Type 3) of ferrule assembly 100. FIG. 4 is a view showing the modified examples of the internal structure of the optical connector of the present disclosure (in FIG. 4, referred to as "Modified Examples of Connector Internal Structure"), and each of the upper row of FIG. 4 (in FIG. 4, referred to as "Upper Positioning Structure") and the lower row of FIG. 4 (in FIG. 4, referred to as "Lower Positioning Structure") corresponds to a cross-sectional view of optical connector 10 taken along the line I-I shown in the uppermost row of FIG. 1.

As shown in the upper row of FIG. 3, optical connector 10 has a housing for stably accommodating ferrule assembly 100 attached to the tip portion of optical fiber 50. The housing is formed of front housing 20 and rear housing 30 fitted into front housing 20. A tip of ferrule 110 forming a part of ferrule assembly 100 protrudes from a front opening of front housing 20. In addition, positioning parts 20A and 20B having inclined surfaces are provided on the inner wall surface of front housing 20 and edge 135 of flange 130 of ferrule assembly 100 which is configured to be accommodated contacts with the inclined surfaces. It is noted that the portion functioning as the positioning part may be only positioning part 20A (refer to "Upper Positioning Structure" shown in the upper row of FIG. 4) or only positioning part 20B (refer to "Lower Positioning Structure" shown in the lower row of FIG. 4). When the portion functioning as the positioning part is one of positioning parts 20A and 20B, ferrule assembly 100 is positioned by being sandwiched between positioning part 20A or positioning part 20B and the inner wall surface of the accommodation space. Meanwhile, a spring member 140 (elastic body) is accommodated in rear housing 30, and when rear housing 30 is inserted into front housing 20 from the rear side of front housing 20, spring member 140 is compressed by being sandwiched between ferrule assembly 100 accommodated in front housing 20 and the rear portion of rear housing 30. In addition, a through hole for drawing out optical fiber 50 is provided in the rear portion of rear housing 30. Meanwhile, ferrule assembly 100 receives an elastic force (restoring force of spring member 140) from spring member 140, and edge 135 included in front surface 130a of flange 130 is pushed against positioning part 20A and positioning part 20B of front housing 20. Although a pair of positioning parts 20A and 20B are shown in the example of FIG. 3, one or more positioning parts may be provided on the inner wall surface of front housing 20 so as to correspond to each side defining the shape of front surface 130a of flange 130.

The structure of ferrule assembly 100 is shown in the lower row of FIG. 3 so that its positional relationship with spring member 140 as the elastic body can be seen. As shown in the lower row of FIG. 3, ferrule assembly 100 includes ferrule 110, sleeve 120, and flange 130. Ferrule 110 is attached to the tip portion (glass fiber 51) of optical fiber 50 from which the resin coating is removed. Sleeve 120 has front end surface 120a and rear end surface 120b opposite to each other, a through hole into which the rear portion of ferrule 110 is fitted, and projection 121. Optical fiber 50 passes through the through hole of sleeve 120 in a state where ferrule 110 is inserted. In addition, projection 121 of sleeve 120 extends from the central axis of the through hole of the sleeve toward the inner wall surface of the housing. Furthermore, projection 121 has front surface 121a and rear surface 121b. Front surface 121a of projection 121 is positioned on the side where front end surface 120a is provided and pushes flange 130 toward positioning parts 20A and 20B. Rear surface 121b of projection 121 receives the elastic force of spring member 140. Flange 130 has through hole 131, front surface 130a, and rear surface 130b so as to be positioned between positioning parts 20A and 20B of the housing and projection 121 of sleeve 120. Front surface 130a of flange 130 includes edge 135 contacting the inclined surface of positioning part 20A or 20B of the housing. Rear surface 130b of flange 130 contacts or is close to front surface 121a of projection 121.

As described above, ferrule assembly 100 applied to optical connector 10 of the present disclosure has a structure in which the restoring force of spring member 140 is not directly transmitted to flange 130 but is transmitted to flange 130 through a portion (projection 121) of sleeve 120. In other words, ferrule assembly 100 according to the present embodiment has a structure in which spring member 140 (elastic body) is not in direct contact with flange 130 (structure separated by a predetermined distance through projection 121 of sleeve 120). The technical effects of this structure are described below with reference to FIG. 5.

Figure 5:
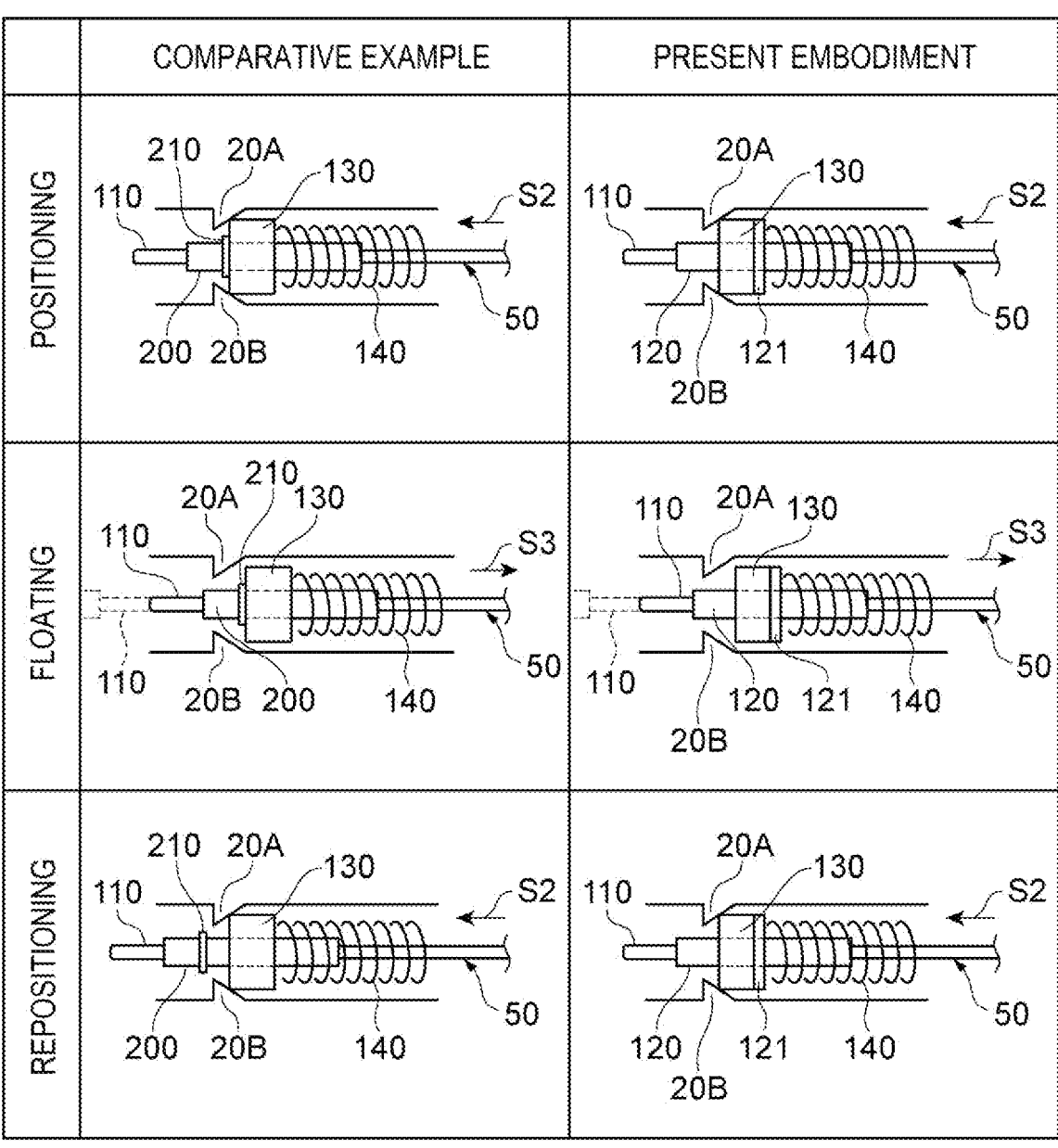
FIG. 5 is a view for explaining the technical effect of the optical connector of the present disclosure together with a comparative example.

FIG. 5 is a view for explaining the technical effects of the optical connector of the present disclosure together with a comparative example. Specifically, the upper row (in FIG. 5, referred to as "Positioning") is a schematic diagram showing a state where spring member 140 is extended, and ferrule assembly 100 is pushed against positioning parts 20A and 20B of front housing 20 and is positioned for each of the comparative example and the present embodiment. The middle row (in FIG. 5, referred to as "Floating") is a schematic diagram showing a state where ferrule assembly 100 is pushed from the front side and spring member 140 is compressed for each of the comparative example and the embodiment of the present disclosure. The lower row (in FIG. 5, referred to as "Repositioning") is a schematic diagram showing a state where spring member 140 is again extended and ferrule assembly 100 is pushed against positioning parts 20A and 20B of front housing 20 for each of the comparative example and the present embodiment.

In addition, the ferrule assembly of the comparative example and the ferrule assembly of the present embodiment shown in FIG. 5 are different in the sleeve structure and the positional relationship between the sleeve and the flange. Specifically, in the ferrule assembly of the comparative example, the rear portion of ferrule 110 is inserted into the opening of a sleeve 200 at the front end surface side, and a projection 210 is provided on the outer peripheral surface of sleeve 200 to limit the movement of flange 130 toward the front end surface side of ferrule 110. Projection 210 has an outer diameter that does not contact positioning parts 20A and 20B provided on the inner wall of the housing. Meanwhile, in ferrule assembly 100 of the present embodiment, as described above, sleeve 120 is provided with projection 121 receiving the elastic force of spring member 140, and flange 130 is disposed in a section (a front portion of sleeve 120) between projection 121 of sleeve 120 and positioning parts 20A and 20B.

In the "Positioning" shown in the upper row of FIG. 5, in the case of the ferrule assembly of the comparative example, when spring member 140 extends in the direction indicated by an arrow S2 (in the configuration shown in the upper row of FIG. 3, a state where rear housing 30 accommodating spring member 140 is attached to front housing 20), spring member 140 contacts flange 130, and edge 135 of flange 130 is pushed against positioning parts 20A and 20B. At this time, although the accommodation position (direction around the axis) of the ferrule assembly is positioned, sleeve 200 is held by flange 130 in a state where the projection 210 is in contact with flange 130 without receiving the elastic force from spring member 140.

On the other hand, in the case of the ferrule assembly of the present embodiment, when spring member 140 extends in the direction indicated by arrow S2, spring member 140 contacts projection 121 of sleeve 120, and edge 135 of flange 130 is pushed against positioning parts 20A and 20B through projection 121. Accordingly, the accommodation position of the ferrule assembly is positioned.

Next, in "Floating" shown in the middle row of FIG. 5, in both ferrule assemblies of the comparative example and the present embodiment, when the ferrule assembly is pushed in the direction indicated by arrow S3, positioning parts 20A and 20B are separated from flange 130 and flange 130 and sleeve 120 are movable in the housing. That is, the ferrule assembly (hereinafter referred to as "target ferrule assembly") of the comparative example and the present embodiment shown in the middle row of FIG. 5 is pushed in by the connection with another opposing ferrule assembly (in the middle row of FIG. 5, the tip portion of ferrule 110 is indicated by a dashed line, hereinafter referred to as "counterpart ferrule assembly"), and at this time, the front end surfaces of ferrules 110 of both the target ferrule assembly and the counterpart ferrule assembly come into contact with each other to generate friction. In the target ferrule assembly, ferrule 110 is rotationally fixed by this friction. On the other hand, when spring member 140 is compressed at the same time as being pushed in, a rotational force is generated, and the rotational force of spring member 140 is transmitted to a component with which spring member 140 contacts. At this time, sleeve 120 (sleeve 200) and ferrule 110 are firmly integrated by interference-fitting and bonding.

Under the above-described assumption, in the case of the ferrule assembly of the comparative example, the rotational force is transmitted to flange 130, and there is a possibility that the relative angle of flange 130 fluctuates with respect to rotationally fixed ferrule 110 (and the rigidly integrated sleeve 200). In contrast, in the case of the ferrule assembly of the present embodiment, the rotational force is transmitted to projection 121 of sleeve 120, but no force is transmitted to flange 130. Therefore, the relative angle between flange 130 and ferrule 110 does not fluctuate. Further, since sleeve 120 and ferrule 110 are firmly integrated with each other, the relative angle does not fluctuate even when the rotational force is transmitted to projection 121 of sleeve 120.

Further, in "Repositioning" shown in the lower row of FIG. 5, in the case of the ferrule assembly of the comparative example, when spring member 140 extends again in the direction indicated by arrow S2, spring member 140 pushes edge 135 of flange 130 against positioning parts 20A and 20B. At this time, since the relative positional relationship between flange 130 and sleeve 200 fluctuates when spring member 140 is compressed, in the comparative example, when the ferrule assembly is repositioned, the end surface position of ferrule 110 is deviated along the fiber axis direction of optical fiber 50.

On the other hand, in the case of the ferrule assembly of the present embodiment, when spring member 140 extends again in the direction indicated by arrow S2, spring member 140 pushes edge 135 of flange 130 against positioning parts 20A and 20B through projection 121. Since the relative positional relationship between flange 130 and sleeve 120 does not fluctuate when spring member 140 is compressed, the accommodation position of the ferrule assembly is stably maintained.

REFERENCE SIGNS LIST 10 optical connector
20 front housing
20A, 20B positioning part
30 rear housing
40 boots
50 optical fiber
50A MCF (multi-core optical fiber)
50B PMF (polarization maintaining optical fiber)
51, 51A, 51B glass fiber
52A, 52B core
53A, 53B common cladding
54 stress applying part
100 ferrule assembly
110 ferrule
120 sleeve
120a front end surface
120b rear end surface
121 projection
121a front surface (projection front surface)
121b rear surface (projection rear surface)
130 flange
130a front surface (flange front surface)
130b rear surface (flange rear surface)
131 through hole
135 edge
140 spring member (elastic body)
AX fiber axis (central axis)
$L_A$ line (line indicating reference direction)
$L_R$ setting reference line
S1 to S3 movement or rotational direction.

The invention claimed is:
1. An optical connector comprising:
an optical fiber;
a ferrule assembly attached to a tip portion of the optical fiber; and
a housing configured to accommodate the ferrule assembly,
wherein the housing has an inner wall surface and a positioning part, the inner wall surface defining a space in which the ferrule assembly is to be accommodated, the positioning part defining a position where the ferrule assembly is to be accommodated and being provided on the inner wall surface, wherein the positioning part has an inclined surface inclined with respect to a central axis of the tip portion of the optical fiber and with which a part of the ferrule assembly is to contact, wherein the ferrule assembly includes a ferrule;

a sleeve having a sleeve through hole receiving a part of the ferrule before being attached to the tip portion of the optical fiber or after being attached to the tip portion of the optical fiber; and a flange having a flange through hole receiving the sleeve, wherein the sleeve has a front end surface and a rear end surface facing each other, wherein the sleeve through hole connects the front end surface and the rear end surface to each other and, with the optical fiber passing through the sleeve through hole, receives a part of the ferrule from a side where the front end surface is provided, wherein the sleeve includes a projection extending from a central axis of the sleeve through hole toward the inner wall surface of the housing, and having a projection front surface and a projection rear surface, the projection front surface being positioned on the side where the front end surface is provided and the projection rear surface being positioned on a side where the rear end surface is provided, and wherein the flange is disposed between the positioning part of the housing and the projection of the sleeve, and has a flange front surface and a flange rear surface, the flange front surface including an edge contacting the inclined surface of the positioning part of the housing such that the edge is positioned to press against the inclined surface along a normal line to the inclined surface, the flange rear surface contacting or being close to the projection front surface.

2. The optical connector according to claim 1, further comprising:

an elastic body contacting the projection rear surface, and provided for pushing the edge of the flange front surface against the inclined surface along the normal line through the projection.

3. The optical connector according to claim 2, wherein the optical fiber is a multi-core optical fiber or a polarization maintaining optical fiber.

4. The optical connector according to claim 1, wherein the optical fiber is a multi-core optical fiber or a polarization maintaining optical fiber.

5. The optical connector according to claim 1, wherein the inclined surface is an innermost surface of the positioning part toward a center of the space in which the ferrule assembly is accommodated.

* * * * *